Aug. 26, 1947.  J. O. BERNDTSON  2,426,160
TRANSMISSION MECHANISM
Filed March 26, 1943   9 Sheets-Sheet 3
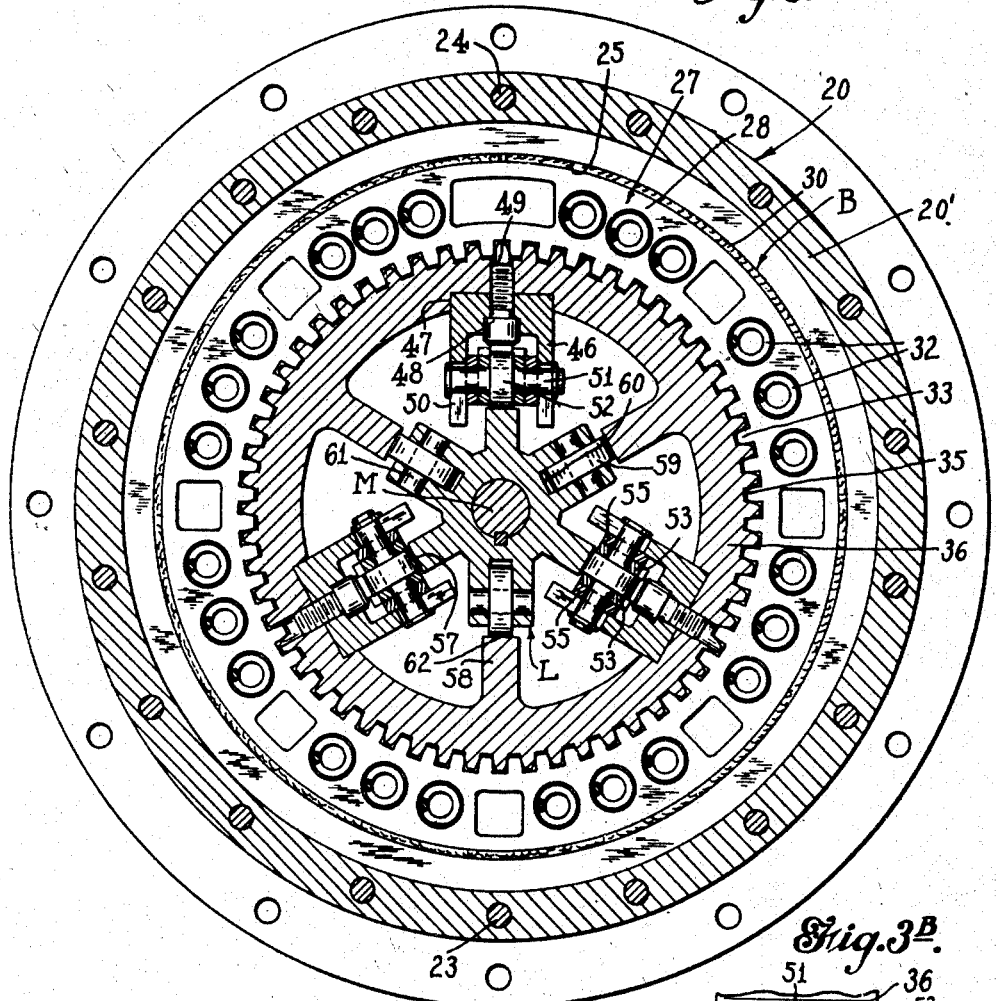
Fig. 3.
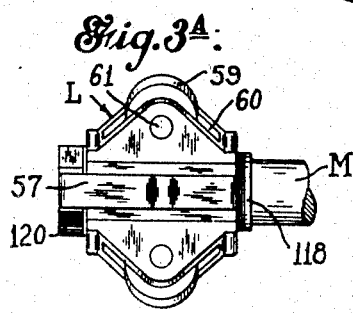
Fig. 3ᴬ.
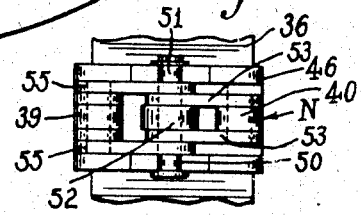
Fig. 3ᴮ.
Inventor
John O. Berndtson
By Rockwell & Bartholow
Attorneys Aug. 26, 1947.　　　　J. O. BERNDTSON　　　　2,426,160
TRANSMISSION MECHANISM
Filed March 26, 1943　　　　9 Sheets-Sheet 4

Inventor
John O. Berndtson
By Rockwell & Bartholow
Attorneys

Aug. 26, 1947.　　　J. O. BERNDTSON　　　2,426,160
TRANSMISSION MECHANISM
Filed March 26, 1943　　　9 Sheets-Sheet 5

Inventor
John O. Berndtson
By Rockwell & Bartholow
Attorneys

Inventor
John O. Berndtson

Aug. 26, 1947.          J. O. BERNDTSON          2,426,160
TRANSMISSION MECHANISM
Filed March 26, 1943          9 Sheets-Sheet 7
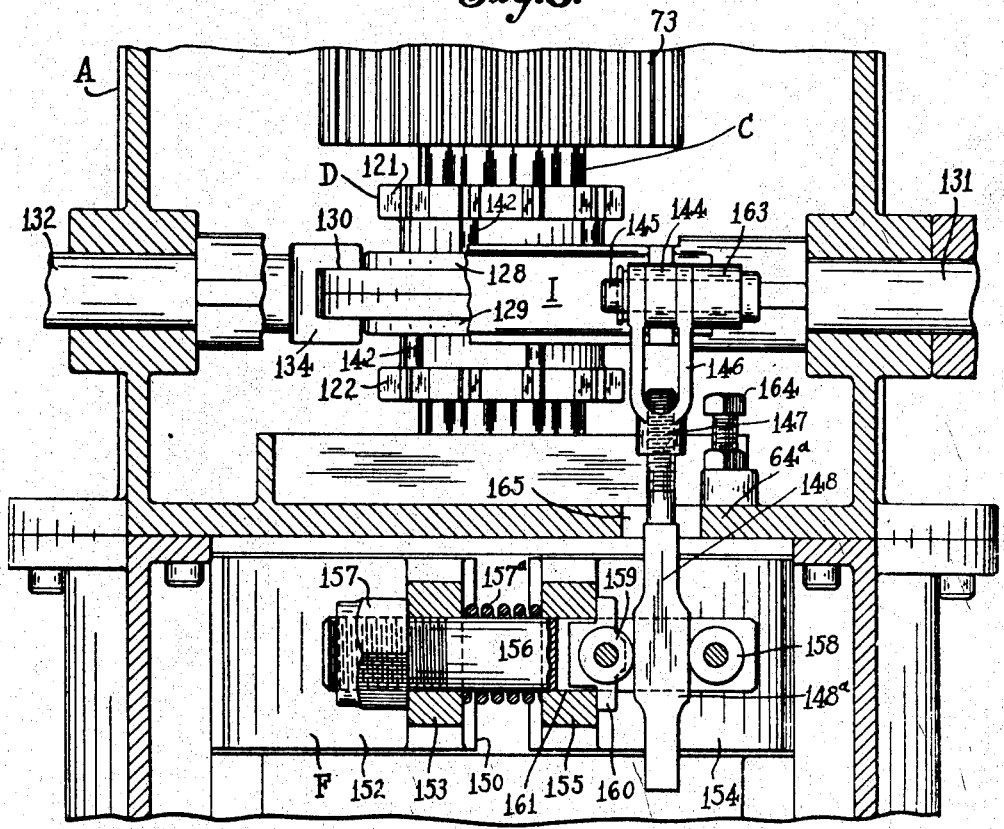
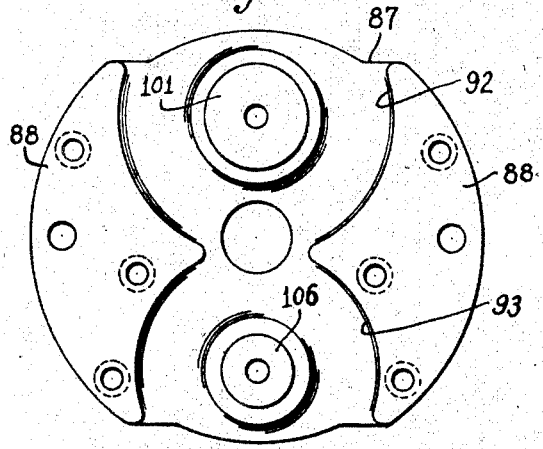

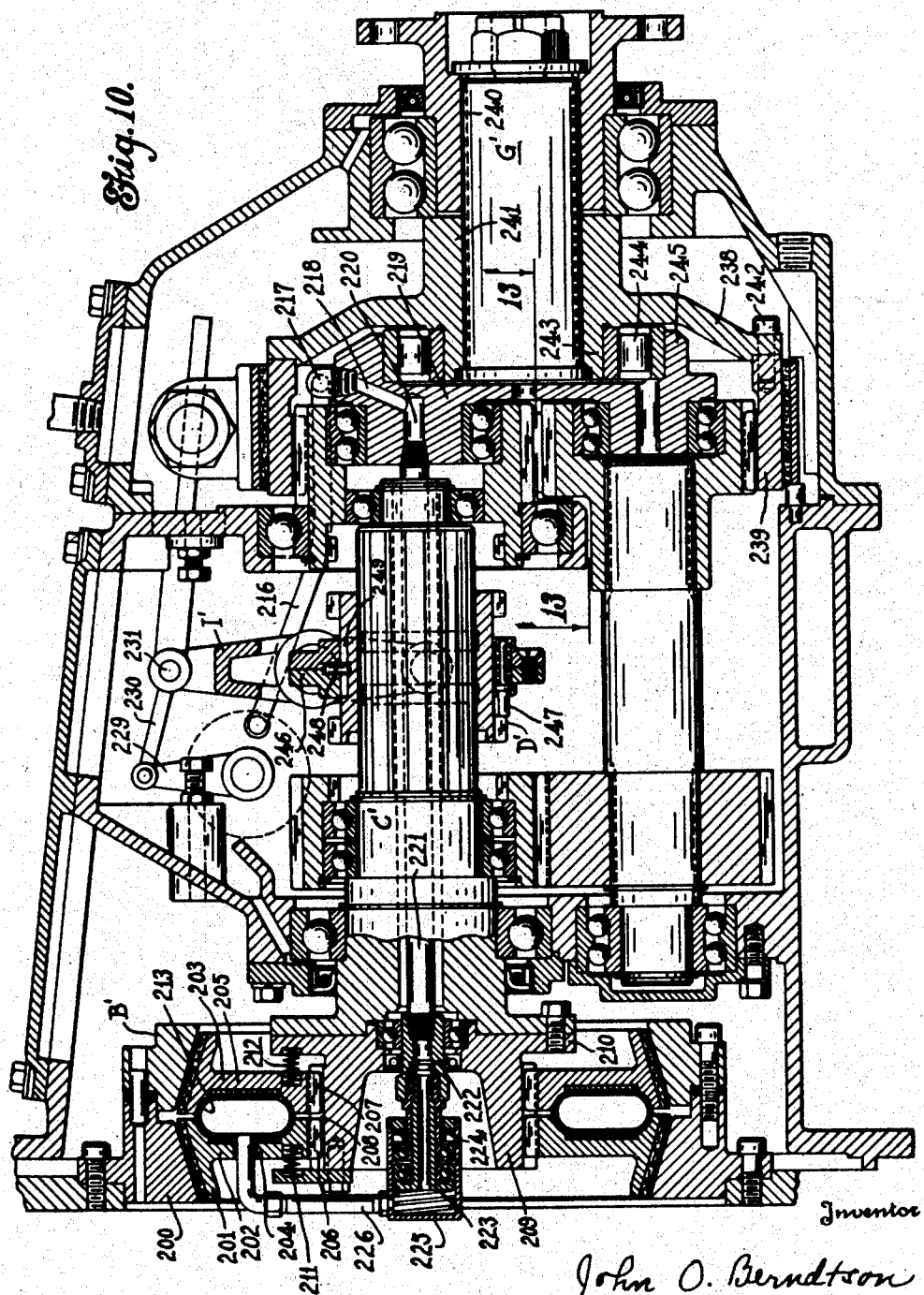

Aug. 26, 1947.  J. O. BERNDTSON  2,426,160
TRANSMISSION MECHANISM
Filed March 26, 1943  9 Sheets-Sheet 9

Inventor
John O. Berndtson
By Rockwell & Bartholow
Attorneys

Patented Aug. 26, 1947

2,426,160

UNITED STATES PATENT OFFICE 2,426,160

TRANSMISSION MECHANISM

John O. Berndtson, Short Beach, Conn., assignor to The Snow-Nabstedt Gear Corporation, New Haven, Conn., a corporation of Connecticut Application March 26, 1943, Serial No. 480,626

21 Claims. (Cl. 192—3.5)

This invention relates to transmission mechanisms and while not limited thereto it has special application to gearing for marine use in which there is not only provision for reversing the direction of drive of the propeller shaft or other driven shaft but also for obtaining a drive at reduced speed.

One of the objects of the invention is to provide a very strong and rugged gear well adapted for heavy duty service.

Another object is to provide a very simple and compact arrangement of gearing.

Another purpose of the invention is to provide a transmission in which the gear shifts for forward and reverse drive can be effected very easily and without clashing.

Another purpose is to provide a transmission in which when the shift from neutral to forward drive or to reverse drive is made the main gears are stationary so as to facilitate the shift into forward drive or reverse.

Other objects of the invention are to furnish a simple and effective control for the gearing and to supply a transmission in which a sturdy and powerful clutch can be used.

To these and other ends the invention consists in the novel features and combinations of parts hereinafter described and finally pointed out in the claims.

In the accompanying drawings:

Fig. 3 is a section on line 3—3 of Fig. 1;

Fig. 3A is a detail plan view of the cam for operating the friction clutch;

Fig. 3B is a detail section on line 3B—3B of Fig. 1;

Fig. 8 is a section on line 8—8 of Fig. 6 showing among other things the means for tightening and releasing the brake band which surrounds the internal gear carried by the driven shaft, the position shown being the neutral position;

Fig. 9 is a detail face view of the supporting yoke from which the internal gear and certain other parts are supported;

Fig. 10 is a longitudinal vertical section showing a transmission of somewhat modified form;

Figure 1:
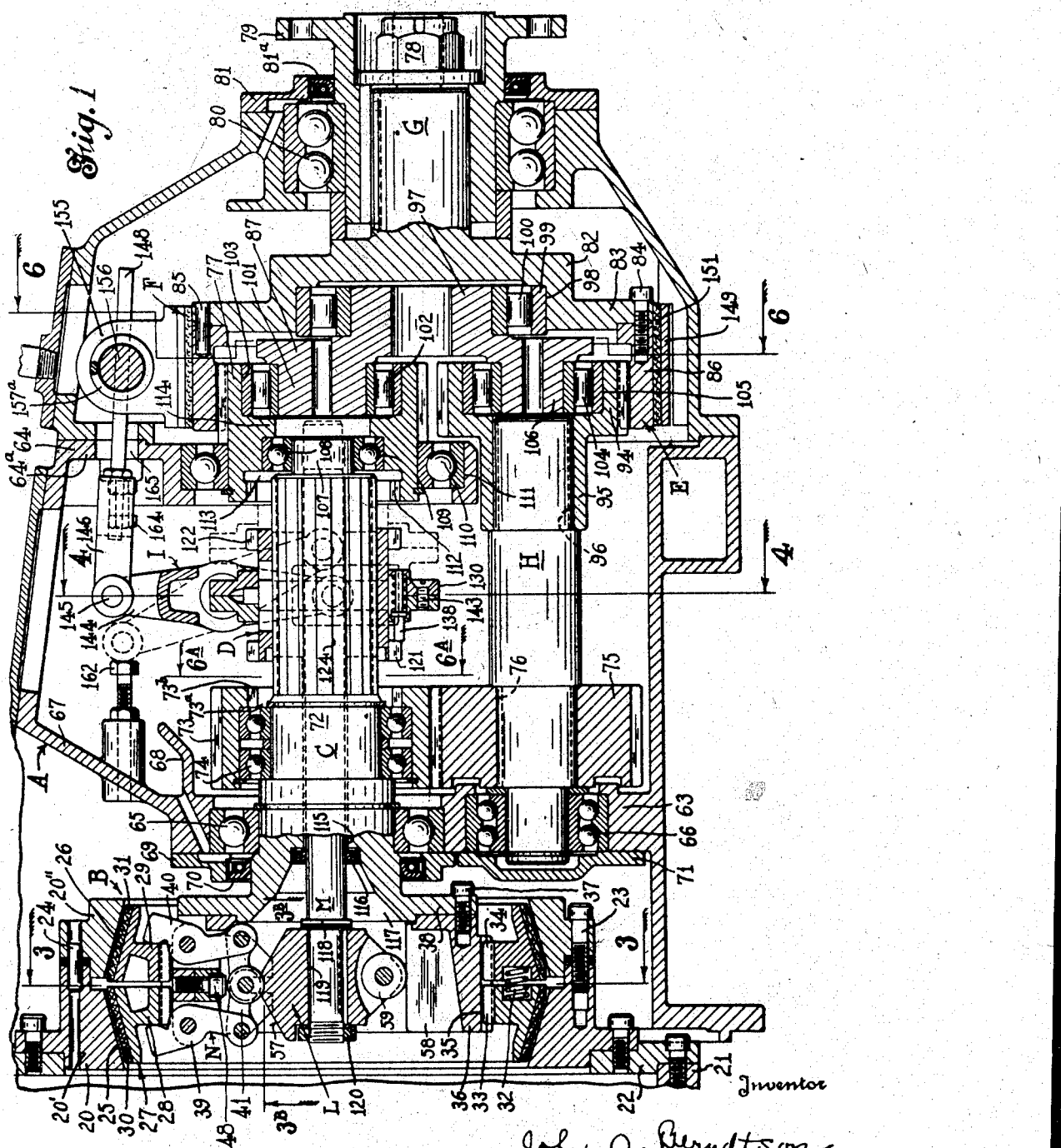
Fig. 1 is a central longitudinal section of a transmission embodying my improvements, the shiftable dog clutch member and certain other parts associated therewith being shown in section along line X—X of Fig. 4, the transmission being in neutral position.

In the drawings the invention is shown as applied to a marine reverse and reduction gear having at the forward end a double cone clutch member adapted to be driven from the engine and adapted when engaged to drive a double cone clutch member connected to the forward end of a drive shaft adapted to drive from its rear end an internal gear carried by a driven shaft arranged in the rear end portion of the transmission housing and adapted to drive a propeller shaft or other power take off. Parallel to the drive shaft is a countershaft arranged so that under certain conditions it can be rotated from the drive shaft in a reverse direction in order to drive in a reverse direction the internal gear carried by the driven shaft. Arranged to slide along the drive shaft is a dog clutch member controlled coordinately with the main friction clutch and adapted to be shifted rearwardly in order to produce the forward drive action above mentioned and adapted when shifted forwardly to produce drive in the reverse direction. When this dog clutch member, shiftable along the drive shaft, is in the intermediate or neutral position, a brake holds the internal gear and therefore the driven shaft against rotation but upon movement of this dog clutch member to the position for forward drive or to the position for reverse drive the brake is released automatically so that the driven shaft is free for rotation.

Referring particularly to the form shown in Figs. 1 to 9, inclusive, the housing of the transmission is indicated generally at A, the friction clutch at B, the drive shaft at C, the dog clutch member at D, the internal gear member at E, the brake associated with the internal gear at F, and the driven shaft at G. The counter shaft, used in reverse drive, is shown at H.

It will be noted that in the form shown the driven shaft G is somewhat lower than the drive shaft C and in turn somewhat higher than the counter shaft H, so as to have an intermediate position with reference to these shafts. The dog clutch member D is shiftable by means of a pivoted yoke member I, operably connected to the brake F in the manner hereinafter described, and this yoke member I is operable by means such as an external lever K shown in Fig. 4. The clutch B is adapted to be engaged and disengaged through the operation of a cam member L mounted on the forward end of a rod M which is shiftable forwardly and rearwardly with the member D.

Referring now to the details, it will be noted that the clutch B comprises an outer member 20 which in this particular instance is driven from a member 21 only partially shown, said member 21 being for example a portion of an engine flywheel. In this particular case the member 21 is connected through a plate 22 to the member 20 but this is by way of example only, and it will be understood that member 20 can receive its rotation from the engine or other prime mover in any suitable or preferred manner. The member 20 is of annular form and comprises a section 20' and a second section 20'', these sections being interconnected by means such as screws 23 and pins or dowels 24. The member 20 is provided internally with oppositely arranged conical friction surfaces 25 and 26, respectively, and these surfaces are adapted to be frictionally engaged by an inner double cone clutch member 27. This inner clutch member 27 includes sections 28 and 29, respectively, which are axially movable with respect to each other. The section 28 has an outer conical surface provided with suitable lining material 30 adapted to make frictional contact with surface 25, while section 29 has an outer conical surface provided with a friction lining 31 adapted to make frictional contact with surface 26. Between sections 28 and 29 helical springs 32 are interposed; these springs being accommodated in suitable sockets, and the tendency of the springs 32 is to separate the sections of the inner clutch member and urge them into contact with corresponding portions of the outer clutch member. The sections of the inner member, however, can be held out of contact with the outer member by the operation of a series of clutch disengaging levers arranged in the manner hereinafter described.

The clutch sections 28 and 29 are in the form of rings having inner parts with inwardly projecting splines or teeth, the splines of the section 28 being indicated at 33 and those of section 28 being indicated at 34. These splines 33 and 34 are engaged in axial grooves 35 extending longitudinally on the outer surface of a ring member 36 (Figs. 2 and 3) which is connected as by bolts 37 to a flange 38 formed or provided on the forward end of the drive shaft C previously mentioned. The ring member 36 serves as a mounting for a series of declutching levers generally indicated at N, which are operable by the cam member L on the forward end of rod M. In the form shown, the levers N comprise three groups of levers equidistantly spaced in a circumferential direction, and each group has a forward lever 39, a rear lever 40, and a toggle connection 41 between the levers which toggle connection is operable by the cam L to press the clutch sections 28 and 29 toward each other for releasing the clutch.

Each forward lever 39 is pivoted intermediate of its ends on the ring 36 by a pin 42 and has at its outer end a rounded nose 43 adapted to exert pressure against section 28. Similarly, each rear lever 40 is pivoted intermediate of its ends by a pin 44 and has a nose 45 adapted to impinge upon and exert pressure against the clutch section 29. When the toggle 41 is straightened as in the position of Fig. 1, the outer ends of the levers have a pinching effect and hold the clutch in a disengaged position.

Each group of levers with its toggle connection has associated with it a channel member 46 set in a groove 47 on the inner face of the ring 36 and secured to the ring in a suitable manner as by means of a screw 48 passing through the bottom of the channel member and engaging a threaded socket 49 in member 36. The pivot pins 42 and 44 are carried directly in member 36. In the side walls of each channel member 46 are notches 50, and operating in these notches are the end portions of a pin 51 forming a part of the toggle 41 and having affixed thereto, intermediate of its ends, a roller 52 adapted to be shifted by the cam member L. The toggle mechanism also includes duplex links 53 having perforations engaged over the pin 50 at opposite sides respectively of the roller 52 and other perforations at the opposite end engaged over the ends of the pin 54 at the inner end of lever 40, as shown in Fig. 3B. The toggle mechanism further comprises a pair of links 55 having end perforations by which they are engaged over pin 51 outside of the links 53 and also having at their opposite ends perforations by which they are engaged over a pin 56 carried by the inner end of lever 39.

Figure 2:
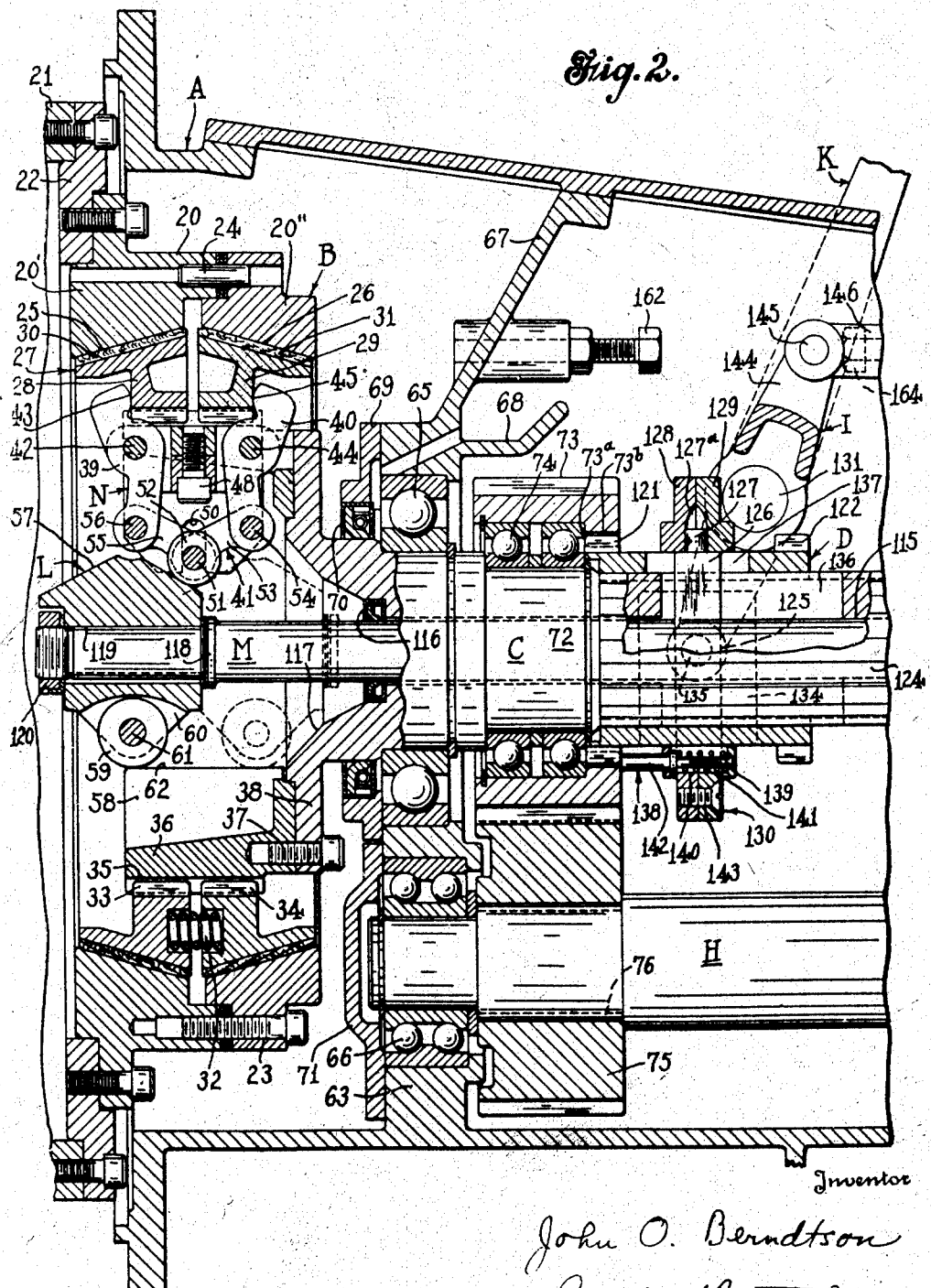
Fig. 2 is a sectional view on a larger scale with portions broken away showing the parts adjacent the forward end of the transmission, the transmission being in position for reverse drive.

The rollers 52 of the several groups of levers are adapted to be engaged by cam portions 57 of cam L which portions 57 are in the form of outwardly projecting radial webs, each such web being in longitudinal section of the shape shown in Fig. 2. It will therefore be understood that as the cam L is moved from the position shown in Fig. 2 to the position shown in Fig. 1, the roller 52 of each group of levers is thrust outwardly so as to straighten the toggle and act upon the adjacent portion of the inner clutch member in a manner to disengage it from the adjacent portion of the outer clutch member.

It is also to be noted that the cam member L is guided in its axial movement from the concentric ring member 36 and that for this purpose this ring member is provided with inwardly projecting radial guide ribs 58 by means of which the cam L is guided. The preferred practice is to mount rollers 59 in cam L within kerfs 60, the rollers 59 having axle members 61 and the rollers having cylindrical portions traveling along flat end faces 62 with which the ribs 58 are provided. The webs or ribs 57 on the cam member also have flat free edges which engage the rollers of the toggles.

The drive shaft C on which the inner clutch member is mounted is a hollow, sleevelike shaft having its forward end arranged in front of a partition 63 extending upwardly from the floor of the housing A, said shaft having a bearing in the upper part of said partition. At its rear end, the shaft C extends into proximity to a partition 64 extended downwardly from the upper wall of the housing, there being provisions whereby the shaft is supported from this second partition also, as hereinafter described. The countershaft H has a bearing in partition 63 below the bearing provided in said partition for shaft C. The bearing provided in partition 63 for shaft C is preferably a ball bearing indicated at 65, and the bearing in said partition for the countershaft is preferably a ball bearing 66. From the upper end of partition 63 a wall 67 extends upwardly and rearwardly to the top wall of the housing so as to close in the rear part of the housing in order that it may contain a body of lubricating oil, and adjacent the lower end of wall 67 is a gutter 68 into which oil is splashed and from which it runs down to the bearings 65 and 66. Oil is prevented from working forwardly around the shaft C because there is provided a front plate 69 on the partition, embracing this shaft and carrying a lubricant seal ring 70. The forward extremity of the countershaft H is enclosed by a cap plate 71 associated with the adjacent partition.

Rearwardly of the partition 63, the shaft C has a somewhat reduced cylindrical portion 72 on which is rotatable a gear pinion 73, there being interposed between portion 72 and pinion 73 a pair of ball bearings 74 arranged side by side.

The pinion 73 is adapted to be engaged by the dog clutch member D previously mentioned and for that purpose has the particular construction hereinafter described. The pinion is loose on shaft C and has external spur teeth in mesh with the teeth of a spur pinion 75 keyed as by means of a key 76 to the forward end portion of the countershaft H.

When the member D is shifted forwardly, it engages pinion 73 so as to cause the drive thereof from the shaft C, and when the member D is shifted rearwardly it engages a pinion member 77, this pinion member 77 being a member meshing with internal gear member E and adapted to drive the driven shaft G. The shaft G has attached to it by means including a nut 78 a coupling member 79 projecting rearwardly out of the housing and adapted to drive a propeller shaft or other power take off, and the shaft G is journaled in the rear wall of the housing by means including a ball bearing 80 surrounding the coupling member 79. A cap plate 81, having a sealing ring 81ᵃ, is applied to the rear wall of the housing around the coupling member in a manner to enclose the bearing 80. Somewhat forwardly of the bearing referred to, the cross section of shaft G is enlarged to provide a portion 82 of cup-shaped formation and from the rim of the cup thus formed extends a web 83, the circumferential portion of which is rigidly connected in any suitable manner as by screws 84 and pins 85 to the ring 86 on whose inner surface are formed the teeth 87ᵃ of the internal gear E. The ring 86 extends forwardly from the web 83. The brake F, previously mentioned, extends around the gear ring 86 and is adapted to be tightened thereon.

Within the cup-shaped structure provided by the internal gear and its supporting part is located a fixed supporting member 87 in the nature of a yoke which is fixed in relation to the housing and acts as a support for several of the adjacent parts. This yoke 87 has side portions 88 by means of which it is rigidly secured by means of screws 89 and pins 90 to a wall member 91 which is associated with and forms a part of the partition 64 previously mentioned. The yoke 87 is at the rear of this wall and the screws 89 are placed in the yoke from the rear face of the latter. At its upper front portion the yoke has a cutaway portion or recess 92 receiving the pinion member 77 and at its forward lower portion it has a similar cutaway part or recess 93 receiving the body of a pinion 94 having a hub 95 keyed at 96 to the rear end portion of countershaft H.

At its rear face, yoke 87 is provided with a rearwardly extending perforated boss 97 which extends into the shallow cup 98 provided in the shouldered shaft portion 82 previously mentioned, and between the cylindrical surface of boss 97 and the inner face of the cup portion is an anti-friction bearing 99, preferably a roller bearing having rollers 100. Thus there is provided an effective bearing and centering means for the adjacent portion of the driven shaft G.

The yoke 87 further provides a bearing for that portion of the pinion 77 which is engaged with the internal gear and for this purpose the yoke is provided with a forwardly projecting cylindrical portion 101 around which is fitted a roller bearing 102, said roller bearing being received in a recess 103 formed in the rear portion of pinion 77. Similarly, yoke 87 provides a bearing for that portion of pinion 94 which is engaged with the internal gear, and for this purpose a roller bearing 104 received in a recess 105 at the rear portion of pinion 94 surrounds a forwardly extending cylindrical portion 106 on the lower portion of the yoke member.

At its rear portion which is extended into proximity to the partition 64 the drive shaft C is reduced in section to provide a small cylindrical terminal portion 107. This portion is surrounded by an anti-friction bearing illustrated as a ball bearing 108, and bearing 108 is received in a recess 109 provided internally in the pinion member 77. Surrounding the forward end portion of pinion member 77 is an anti-friction bearing illustrated as a ball bearing 110 received in a recess 111, provided adjacent the rear face of a wall 64ᵃ, constituting a part of partition 64. Thus it will be seen that the pinion 77 is mounted for free rotation in the partition and the rear concentric end of the drive shaft is capable of independent rotation within and relatively to the pinion.

The pinion 77, as will be seen from Fig. 1, is of special profile having adjacent its forward end internal teeth 112 spaced outwardly from the body of the shaft C and adapted to be engaged by the member D in the manner to be hereinafter described. In this portion of the pinion the outer contour is cylindrical so that the outer ball bearing previously mentioned may be accommodated, but immediately at the rear of this ball bearing the pinion 77 is externally toothed so as to provide for engagement with the internal gear. Rearwardly of the internal teeth 112 the pinion is provided with an internal clearance recess 113 and back of this recess with a recess 109 of smaller diameter receiving the internal ball bearing. Rearwardly of the ball bearing the pinion is provided with an internal shoulder portion 114 and rearwardly of the portion 114 is the recess 103 accommodating the roller bearing by means of which the pinion is supported internally from the yoke member.

The rod M for moving cam L is a round rod housed in a bore 115 in shaft C, this bore being open at the rear end of the shaft and the rod being adapted to be thrust rearwardly out of the bore to a limited extent as shown by the dotted lines in Fig. 1. Adjacent the forward end of the shaft C the same is provided internally with an oil seal ring 116 making contact with the rod so as to prevent lubricant from working out of the forward end of the shaft. Preferably, the oil seal ring 116 is located at the bottom of a flaring recess 117 forming a mouth portion at the front end of the shaft which gives the cam L ample clearance for its movement. Preferably the cam L is held on the rod by means of a collar 118 on the rod rigid with the rod and constituting an abutment for the rear face of the cam. That portion of the rod in front of the collar extends through a bore 119 in the cam and the assembly is completed by means such as a clamping nut 120 having threaded engagement with the forward extremity of the rod and adapted to hold the cam rigidly against its supporting shoulder.

Figure 4:
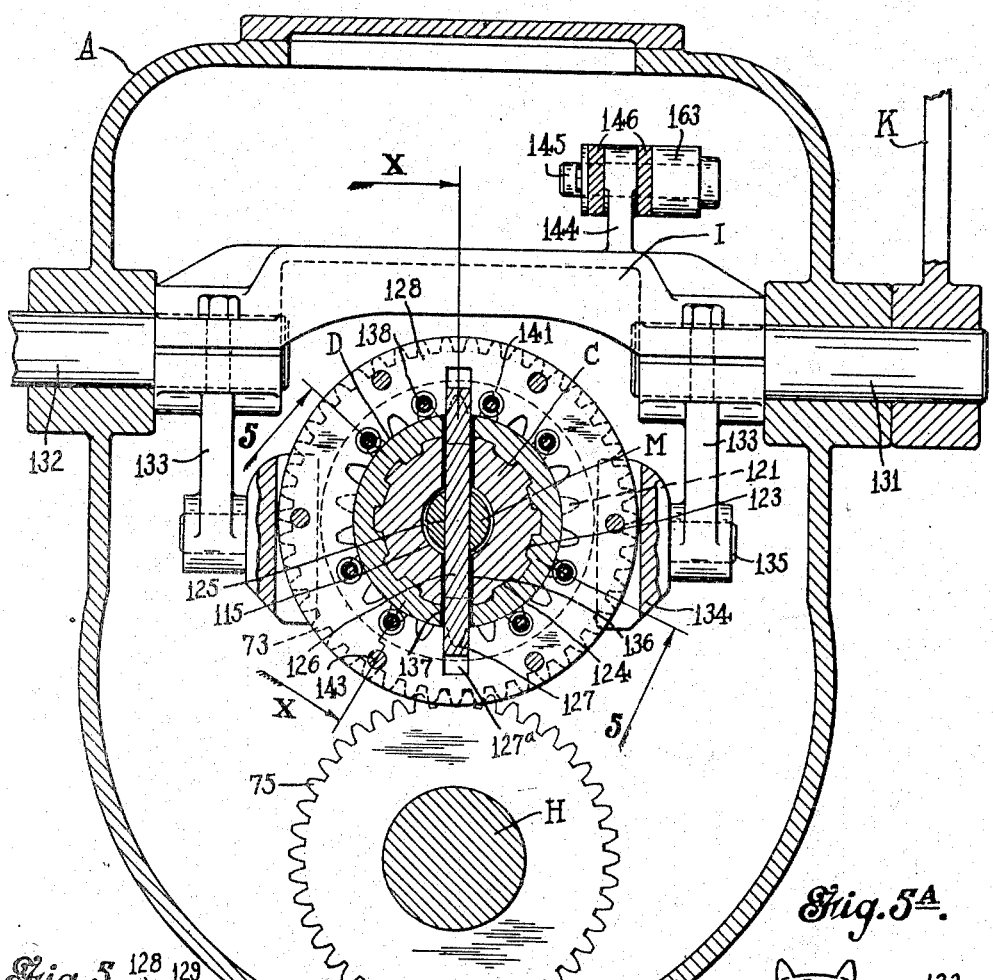
Fig. 4 is a section on line 4—4 of Fig. 1.

The pinion 73, with which the member D cooperates, is provided at the rear with a recessed portion 73a overhanging with a certain amount of clearance a portion of the shaft C, and within this recessed portion the pinion is provided with internal teeth 73b to be engaged by teeth of the member D. This member D, as shown, is constituted by a sleeve slidable along a splined portion of the shaft C. Projecting radially outwardly from member D at the forward end are a plurality of teeth or dogs 121 adapted to engage the spaces between certain of the teeth 73b, and at the rear of the member is a similar series of teeth or dogs 122 adapted to engage the spaces between certain of the internal teeth of pinion 71. The splining of member D on shaft C may be accomplished by providing member D on its inner surface with a plurality of projecting ribs or splines 123 engaging grooves 124 provided in a peripheral portion of the shaft. The rod M is provided at an appropriate point with a rectangular hole 125 in which is received a cross key 126 of rectangular section which extends at both ends past the rod and past the shaft and clutch sleeve as shown in Fig. 4, the terminals of this cross key being rounded as shown at 127 and being received in sockets formed between the adjacent faces of plates 128, 129, abutted and fastened together, said plates together forming a sliding collar 130. This collar 130 is adapted to be shifted axially by operation of lever K, which lever as shown in Fig. 4 is fastened to the end of a shaft 131 rockingly mounted and providing one pivot of the yoke member I, the other pivot being at the opposite side of the housing, as indicated at 132. From the lower part of the yoke member I depend side arms 133, each having a fork 134 at the lower portion thereof. The forks 134 are at opposite sides of the collar 130 and engage over the edges of the collar so that as the yoke I is swung the collar is shifted axially. The forks 134 are pivoted to their supporting arms by means of pins 135. The cross key 126, previously mentioned, not only serves to secure the collar 130 to the rod in such a manner that the rod is moved axially by swinging the yoke I but said cross key likewise serves to prevent rotation of rod M within shaft C, for which purpose the cross key engages longitudinal slots 136 in the shaft C. The sleeve of member D is provided with diametrical slots 137 through which key 126 projects and which permits a certain limited axial movement of the member D relatively to the cross key and the collar to which the cross key is attached.

Figures 5, 5A:
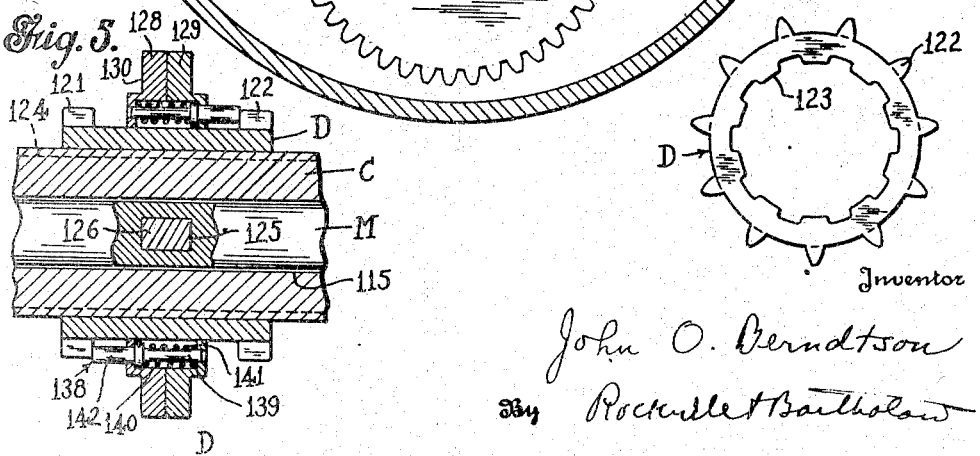
Fig. 5 is a section on line 5—5 of Fig. 4.
Fig. 5A is a detail end view of the dog clutch member.
Figure 6:
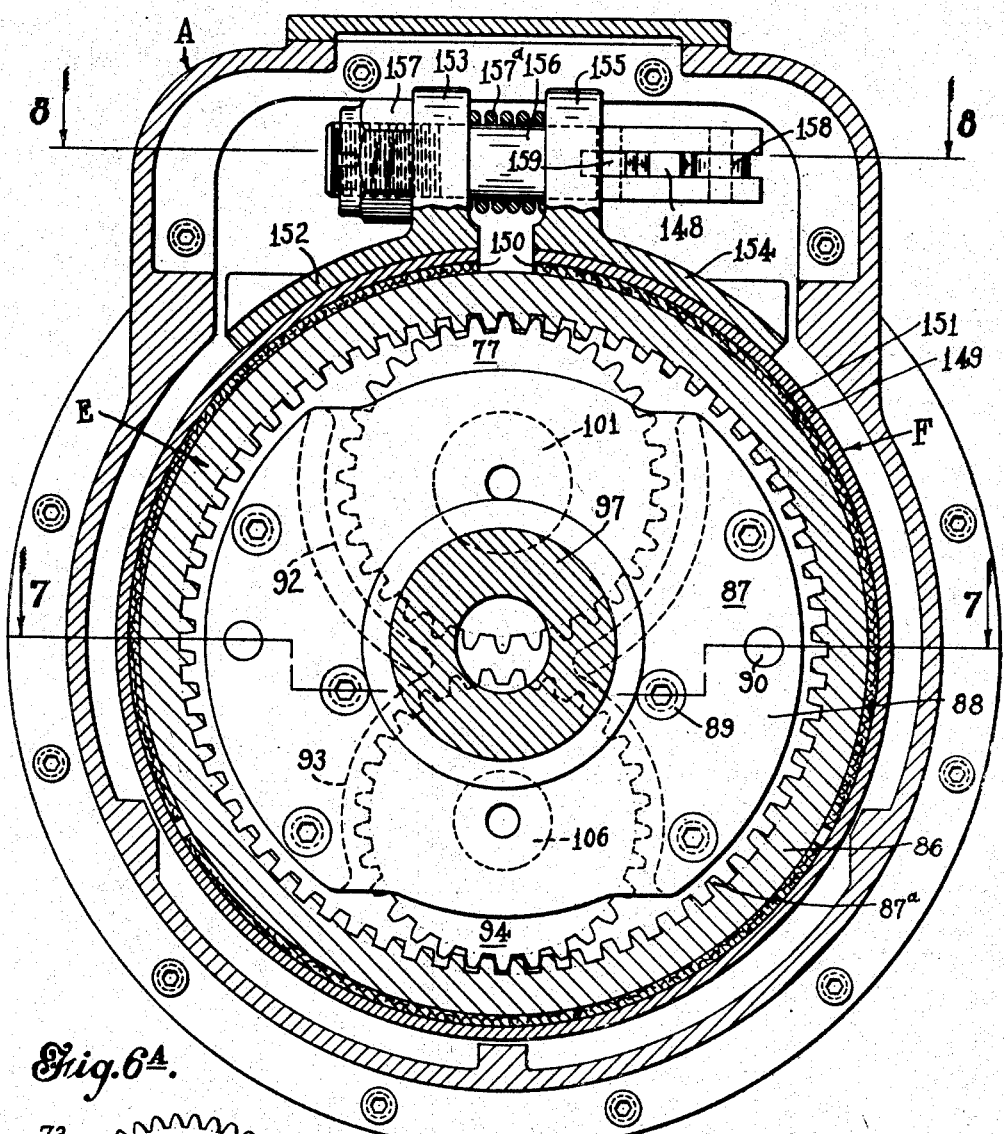
Fig. 6 is a section on line 6—6 of Fig. 1.
Figure 6A:
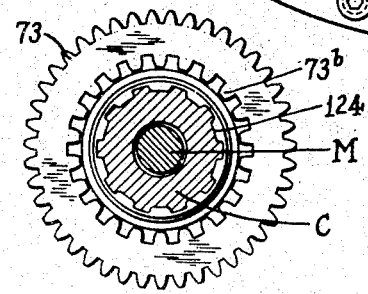
Fig. 6A is a section on line 6A—6A of Fig. 1.
Figure 7:
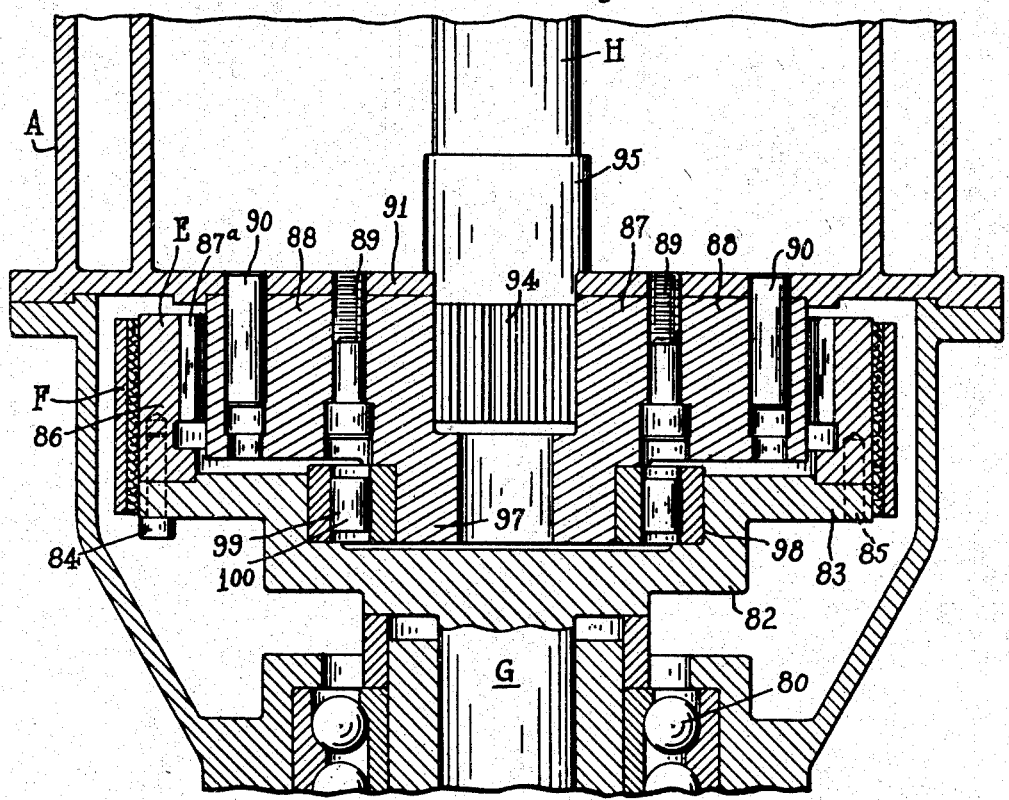
Fig. 7 is a horizontal section on line 7—7 of Fig. 6 of certain parts adjacent the rear end of the transmission.
Figure 13:
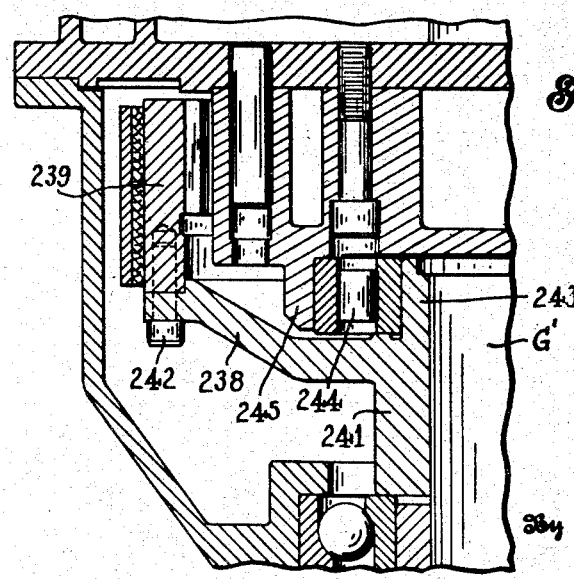
Fig. 13 is a detail section taken on line 13—13 of Fig. 10.
Figure 11:
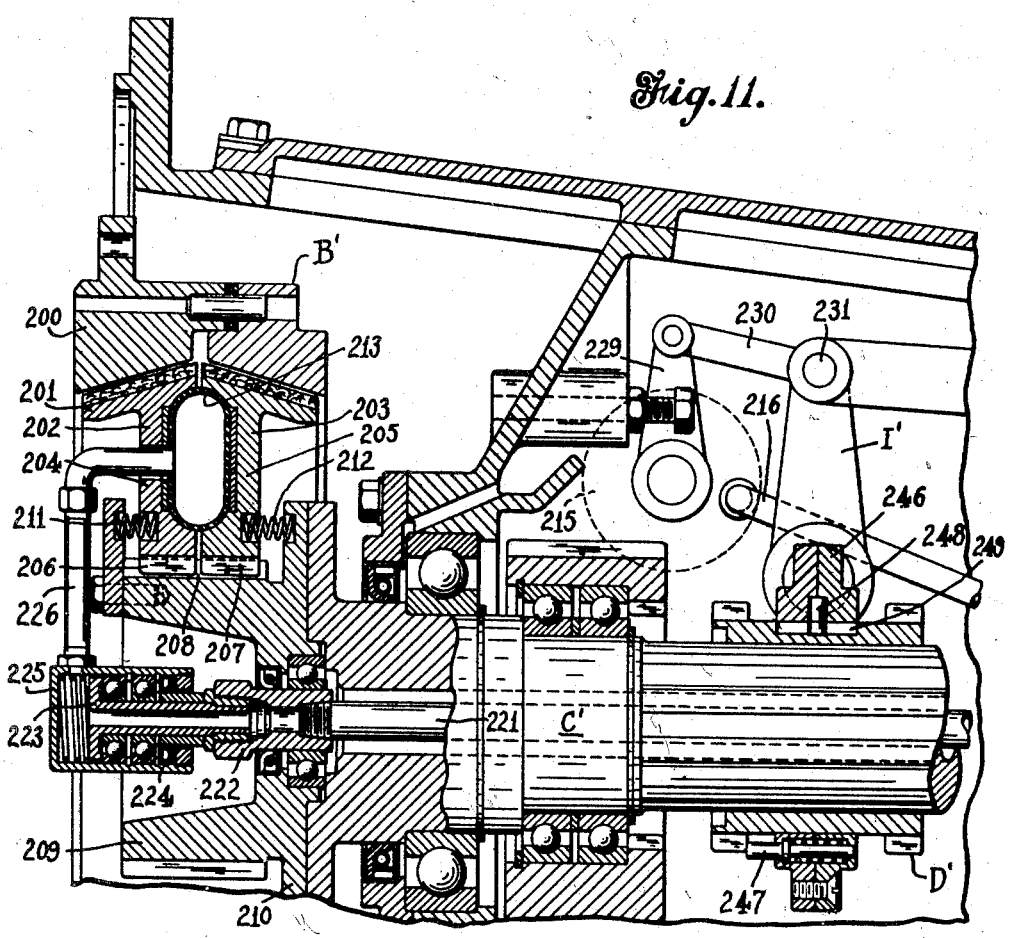
Fig. 11 shows on a larger scale certain parts illustrated in Fig. 10.

The collar 130 shifts the member D in a cushioned manner through a spring arrangement, as will now be described, in order that when the member is shifted into engagement with the forward cooperating pinion or the rearward cooperating pinion, as the case may be, the engagement can be cushioned and gradual in order that there may be no shock or jar. For accomplishing this I prefer to mount a series of spring pressed members 138 in the collar 130, some of these members being adapted to push the member D rearwardly and others being adapted to push it forwardly. In the particular arrangement shown, these members have plungers acting against the teeth on the respective ends of the double clutch member. Each spring-pressed member preferably comprises as shown in Fig. 5 a plunger 139 extending axially of a socket 140 in the collar and having a portion within the socket pressed in axial direction by a compression spring 141. The plunger also has an externally projecting portion 142 at one side of the collar adapted to press the clutch member axially by engagement behind one of the teeth 121 or 122 as the case may be. In Fig. 5 at the lower part there appears a spring-pressed device adapted to shift the clutch member forwardly, while at the upper part of Fig. 5 is a similar device adapted to press the member rearwardly, and it will be understood that it is preferred to have a number of spring-pressed devices arranged to press the member forwardly and an equal number arranged to press it rearwardly. It is understood, of course, that when the member is in the neutral position shown in Fig. 5 the opposite pressures of the spring-pressed devices will be substantially balanced but that when the collar is moved axially in one direction the springs of one set of plungers are compressed strongly so as to move the member strongly and yet resiliently in the corresponding direction.

It will be noted that the members 128, 129, forming the collar, have cutaway inner portions as indicated in Fig. 4, whereby, in assembling, these plates can clear the teeth 121, 122. After being placed over the member D the plates are turned into positions to bring the spring plungers in proper relation to the teeth, after which the plates are anchored in place on the member by having the rounded ends 127 engaged with notches 127a in the plates. The plates are fastened together by means such as screws 143.

The yoke member I is provided with a rigid upwardly extending arm 144, to which is pivoted by a pin 145 a clevis 146 which clevis has an adjustable threaded connection 147 with a bar 148 which controls the tightening and releasing of the brake F. This brake is of the contractable brake-band type and preferably includes in its structure a metal band 149 having a gap 150 between its ends and lined with friction material 151 adapted to be brought into tight contact with the external cylindrical surface of the internal gear E. Attached to one end of the band 149 by means of a plate 152 is a lug 153, and attached to the other end of the band by means of a plate 154 is a lug 155, and between lugs 153 and 155 is extended a shank 156 passing loosely through lug 153 and carrying an adjustable nut 157. The shank 156 has the lug 155 in loosely embracing relation thereto, and a compression spring 157a is arranged between the lugs. A roller 158 is carried by the terminal part of the shank 156, this roller being at one side of the bar 148, and at the opposite side of the bar is a roller 159 mounted on a part 160 held in a recess 161 of lug 155. When the wide part 148a of bar 148 is located between the rollers 158 and 159, the shank 156 is pulled axially so as to tighten the band, but when the bar 148 is moved lengthwise to the position for forward drive or the position for reverse drive a thinner portion of the bar moves opposite the rollers, and then the spring immediately releases the band. The bar 148 extends through the partition member 64 by way of a slot 165.

In Fig. 1 the forward drive position of the yoke I is shown in the dotted lines and it will be observed that when the yoke member reaches the forward drive position it is arrested by the portion 144 coming into contact with a threaded adjustable stop member 162. On the other hand, when the yoke member I is moved to the position for reverse drive, a sleeve 163 surrounding the pin 145 is adapted to come into contact with a threaded adjustable stop member 164, best shown in Fig. 8.

Let it be supposed that the gear illustrated is in the neutral position shown in Fig. 1, the engine being running. In this condition, the outer member 20 of friction clutch B is rotating with the engine flywheel but the inner double cone member of the clutch is not engaged, being held out of action by means of the cam L which holds the toggles 41 straight and causes a pinching action to be exerted by the forward ends of the levers 39 and 40 on the spring-separated sections of the inner clutch member. There is therefore no drive of drive shaft C, and as the yoke member I is in a position in which the internal gear E is braked by its brake band, there is no rotation of the driven shaft G. Now, if it is desired to effect forward drive, this is accomplished by actuation of lever K in a direction to move yoke I counter-clockwise (Fig. 1), moving yoke member I into the position shown in the dotted lines in Fig. 1. One effect of this is to draw the rod M rearwardly, and another effect is to shift the member D rearwardly so that it will be drivingly engaged with the pinion 77. At the same time that member D is moving rearwardly, the rod M is moving rearwardly, and the yoke member I is moving the bar 148 of brake F toward position for release, and the timing should be such that the member D will be engaged with the pinion 77 before the brake is released and before the shaft C begins to turn as a result of the engagement of the friction clutch. In the event that the teeth 122 of member D do not immediately have full engagement with the internal teeth of pinion 77 as the member D is shifted by its springs, the respective sets of teeth will quickly mesh fully upon the commencement of any relative rotation, which rotation will bring the parts into position for quick meshing under influence of the springs. After meshing of member D with pinion 77, the release of the brake F can take place. In other words, the brake band holds the pinion, through the internal gear, stationary so as to insure silent meshing without clashing, and then the brake having accomplished one of its most important functions is released to release the driven shaft which is rotated from the pinion 77 driven from the clutch. At about this time the rod M reaches its fully retracted position and the clutch B is fully engaged.

To go back to neutral, the movement of yoke member I is reversed and then from neutral the gearing can be placed in position for reverse drive by movement of yoke I from the position of Fig. 1 in a clockwise direction which brings the parts into the full line position shown in Fig. 2. First, the member D is shifted to engagement with pinion 73 in a manner which will be fully understood, and then as pinion 73 is rotated, pinion 75, counter shaft H, and pinion 94 will be rotated in the reverse direction for effecting reverse drive just as soon as internal gear E is released, and clutch B engaged through the movement of the cam L to the inoperative position shown in full lines in Fig. 2.

It will be seen that in this form of the mechanism the ring member 36 serves as a driving hub carried by the forward end of the drive shaft C, that part 20 provides a drive member located radially outwardly of said hub, that the operating means for the friction clutch comprises the cam L and the rod M, and that braking means for the driven shaft G is provided by the band F and its associated mechanism. Selectively operable gear means for interconnecting the drive shaft and the driven shaft is provided by the internal gear on the driven shaft and the pinions 77 and 73 (the latter pinion having associated with it the counter-shaft gearing), the two pinions being selectively rotatable by the shiftable double dog clutch member D movable axially of the drive shaft. An operating element for the shiftable element D is provided by the yoke I and means as above described connects said yoke with the braking means. The reduction gearing between the driven shaft and the drive shaft includes the internal gear E and the associated pinions for rotating said gear in opposite directions.

In the modified form of my invention shown in Figs. 10 to 13, inclusive, the principal difference over the form first described resides in the employment of a different kind of actuating means for the friction clutch between the engine-driven member and the forward end of the drive shaft. In this modified form a double cone friction clutch is employed as before, the inner member of said clutch comprising axially movable sections; but the sections are under the influence of springs pressing them toward each other rather than away from each other so that normally the clutch is in the disengaged position but may be actuated to the engaged position by the expansion of an annular expansible elastic member adapted to be expanded by internal fluid pressure.

In this form, the friction clutch B' has an outer double cone member 200 and an inner member 201 comprising axially movable sections 202, 203 having webs 204, 205, respectively with splines 206, 207 engaged in grooves 208 of a hub member 209 attached to a flange 210 provided at the forward end of the drive shaft C'. Small helical springs 211, 212 press the sections toward each other so as to hold the inner member in disengaged position. A hollow annular elastic bladder 213 comprising rubber or rubber-like material is interposed between the webs of the sections and is adapted to receive fluid such as compressed air which when admitted to the bladder has the effect of engaging the clutch in opposition to the action of the springs.

The air for actuating the clutch is derived from a suitable source of air under pressure and is delivered by a pipe 214 to a valve 215 of the rotary type mounted on the outside of the housing. This valve is indicated by the dotted lines in Figs. 10 and 11, and is shown in section in Fig. 12. This valve delivers air to a pipe 216 and said pipe is extended rearwardly in the gear housing to make a connection at 217 (Fig. 10) with a conduit 218 in a yoke member 219 corresponding generally to the yoke member 87 previously described. Communicating with conduit 218 is a duct 220 leading to a fixed tube 221 that extends forwardly through a bore in the shaft C' and is connected to a coupling 222 which, in turn, is connected to the fixed hollow inner member 223 of a sealing device 224 having a rotary cover 225 connected by a pipe 226 to the bladder 213, the arrangement being such that air is supplied without leakage to the bladder notwithstanding the translation of the pipe 226 about the axis of the inner clutch member when the clutch is engaged. This translation of the pipe is facilitated by the provision of anti-friction bearings within the device 224, providing for the rotation of the cover member about the clutch axis, carrying with it the pipe connected to the bladder.

The valve 215 comprises a casing 227 in which rotates a body 228 connected by an arm 229 and a link 230 to a shaft 231 carried by the yoke I'. The body 228 has an open interior 232 into which lead radial passages 233, 234, and 235, and between passages 233 and 234 in a cutaway portion 236. Leading out of the casing 227 is an escape port 237.

Figure 12:
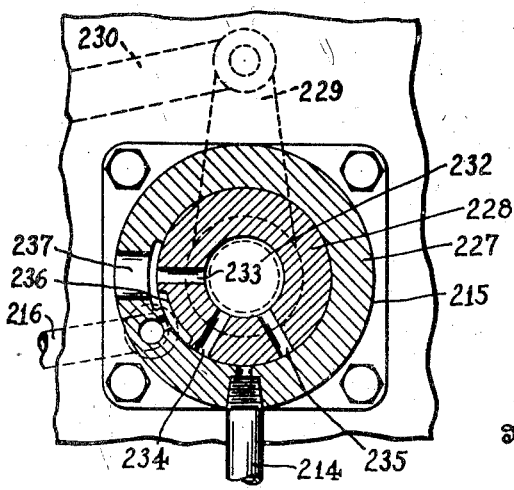
Fig. 12 is a detail of the valve controlling the operation of the expansible bladder member by means of which the friction clutch is engaged.

When the air valve is in the neutral position as shown in Fig. 12, incoming air from inlet pipe 214 is cut off by a solid portion of the valve body, and on the other hand the bladder is in communication with the atmosphere by way of the pipe 216, the cutaway portion 236, and the escape port 237. Now when the valve is shifted to the position for direct drive, in doing which the arm 229 as viewed in Fig. 12 has a counter-clockwise rotation, air will be supplied to the bladder through the passages 234, 233 which register, respectively, with the pipes 214 and 216. Therefore the bladder will be expanded and will engage the inner member of the clutch with the outer member. On the other hand, in moving to the position for reverse drive the valve will be shifted so that the passages 235 and 234 are respectively in register with the pipes 214 and 216 so that in this case also the bladder will be expanded for engaging the clutch. When the valve moves back to the neutral position, each time, the pressure in the bladder is relieved because the pipe 216 is placed in communication with the escape port in the manner above described.

Besides the difference in the friction clutch, there is, in this second form, a difference in respect to the form and arrangement of the yoke member associated with the driving gears which mesh with the internal gear member. Here the yoke member is of different shape from yoke member 87 and the web extending outwardly from the driven shaft G' to carry the internal gear ring is formed and arranged in a different manner. The shaft G' has keyed to it by key means 240 a sleeve 241 to which is integrally joined a web 238 having a forwardly inclined portion secured as by screws 242 to the internal gear ring 239. The sleeve 241 has at the forward end portion a flange 243 supporting an external roller bearing 244 which is received within an axial flange 245 extending rearwardly from the yoke member 219 adjacent the periphery thereof. By this arrangement the yoke member supports exteriorly a part of the drive shaft structure, and this is of definite advantage under certain conditions. The drive shaft structure itself is also simple and strong, the internal gear being very effectively supported for rotation.

In this second form, the member D' is substantially the same as member D, being guided lengthwise on the drive shaft by means of splines or the like. In this case a collar member 246 is provided which is similar to the previously described collar member, carrying a number of spring-pressed plungers 247 similar to those previously described and acting in the same manner as resilient pusher members for the clutch member. In this case the collar member, after being assembled with the clutch member, with the spring-pressed plungers in their proper positions behind the teeth, is held in position by means such as an internal pin 248 associated with the collar and engaging a longitudinal guide groove 249 in the sleeve of the clutch. By this arrangement also the collar is permitted the requisite axial movement so that it can shift the clutch sleeve through the resilient pusher elements.

It will be seen from the above that the invention provides a reduction and reverse gear of relatively simple structure which is strong and rugged and well adapted to conditions of heavy service. The improved mechanism is especially well adapted for marine use and in that connection it has special application to reverse and reduction gears of fishing boats and other heavy-duty boats where the power is commonly provided by Diesel engines. However, the invention has various other applications.

The transmission is suited for heavy duty service because among other things there can be a substantial reduction of speed between the engine shaft and the propeller shaft. In the particular case shown, the pinion cooperating with the internal gear for forward drive is of such dimensions as to provide a reduction of the order of 2 to 1, and the gears used in connection with the reverse drive to the internal gear are of such proportions that in reverse the drive of the driven shaft is somewhat slower than in forward drive. However, the gears can be changed in size to suit different conditions and there is no limitation to specific gear ratios.

A definite advantage arises from the simple and compact arrangement of the gear elements which provide the forward and reverse drive at reduced speed in comparison to the engine speed. Owing to the provision of the braking element shown herein as a brake band, which brakes the driven shaft when the transmission is in neutral position, the main gears of the transmission are stationary when the shift to forward or reverse is made, and this greatly facilitates the shift, enabling it to be made without clashing or jar. This action is also greatly facilitated by the provision of the resilient members between the clutch sleeve member and the shifting yoke which acts as a pusher for the sleeve member in moving it to the forward drive position or to the reverse drive position.

Still another advantage arises from the fact that the transmission is of a character permitting a sturdy and powerful clutch to be used. This clutch is housed in a special compartment in the front end of the transmission, from which compartment the lubricating oil lubricating the gearing is effectively excluded. The clutch structure itself is of improved form and is capable of transmitting a large amount of power.

Other very definite advantages arise from the relative arrangement of the drive shaft, counter shaft, and driven shaft, and from the arrangement of the gears and supports associated with the rear ends of the drive shaft and counter shaft and the forward end of the driven shaft.

While in the examples illustrated the shaft carrying the internal gear is the driven shaft, it will be understood that in some cases this shaft may be the drive shaft.

I do not claim broadly herein the combination of a housing constructed of two separable sections, one being a front section and the other a rear section, a longitudinal shaft in the front section, an offset shaft in the rear section, reduction gearing between said shafts, including an internal gear carried by the offset shaft and a pinion driven from the other shaft, a transverse partition member carried by one of the housing sections, and a supporting member for said reduction gearing in the form of a yoke mounted upon said partition member, as claimed in my application, Serial No. 511,955, filed November 27, 1943.

While I have illustrated and described two forms of the improved transmission mechanism, it is to be understood that the invention can be embodied in many other forms and that various modifications and changes in the organization of parts and in the details can be made without departing from the principles of the invention or the scope of the claims.

What I claim is:

1. In a transmission mechanism, the combination of a drive shaft, a driven shaft, a clutch for controlling the operation of the drive shaft, operating means for the clutch, braking means for the driven shaft, selectively operable gear means for interconnecting said shafts for forward or reverse drive including a shiftable member movable axially of the drive shaft, an operating element for said shiftable member, means connecting said operating element with said braking means, and means for connecting said operating element with said clutch operating means, said clutch operating means including a camming element movable axially of the driving shaft.

2. In a transmission mechanism, the combination of a drive shaft, a driven shaft, a clutch for controlling the operation of the drive shaft, operating means for the clutch, braking means for the driven shaft disposed about the driven shaft, selectively operable gear means for interconnecting said shafts for forward or reverse drive including a shiftable member disposed about and movable axially of the drive shaft, an operating element for said shiftable member, means connecting said operating element with said braking means, and means for connecting said operating element with said clutch operating means, said clutch operating means being fluid-operated and including a fluid-controlling valve operably connected to said operating element and also including a fluid conduit disposed within the drive shaft.

3. In a transmission mechanism, the combination of a drive shaft, a friction clutch for controlling the operation of said shaft, a driven shaft parallel to the drive shaft, gear means including a shiftable dog clutch member for selectively interconnecting said shafts for forward or reverse drive, said means also including an internal gear carried by the driven shaft, a brake band embracing said internal gear and adapted to brake the driven shaft, means for operating said band, means for operating the friction clutch, and means interconnecting the friction clutch operating means, the shiftable member of the gear means and the brake band operating means.

4. In a transmission mechanism, the combination of a drive shaft, a friction clutch for controlling the operation of said shaft, a driven shaft, gear means including a shiftable member for selectively interconnecting said shafts for forward or reverse drive, said means also including an internal gear carried by the driven shaft, a brake band embracing said internal gear and adapted to brake the driven shaft, means for operating said band, means for operating the friction clutch, and means interconnecting the friction clutch operating means, the shiftable member of the gear means and the brake band operating means, said friction clutch including inner and outer members and said friction clutch operating means including an axially shiftable cam and groups of declutching levers associated with the inner member operable from said cam.

5. In a transmission mechanism, the combination of a drive shaft, a friction clutch for controlling the operation of said shaft, a driven shaft, a gear means including a shiftable member for selectively interconnecting said shafts for forward or reverse drive, said means also including an internal gear carried by the driven shaft, a brake band embracing said internal gear and adapted to brake the driven shaft, means for operating said band, means for operating the friction clutch, and means interconnecting the friction clutch operating means, the shiftable member of the gear means and the brake band operating means, said friction clutch including inner and outer members, the inner member comprising separable sections and the friction clutch operating means including fluid means for separating the sections and thereby engaging the clutch.

6. In a transmission mechanism, the combination of a housing, a driven shaft located in the rear portion of the housing, a drive shaft above the driven shaft and in offset parallel relation thereto and having a forward end adjacent the forward end of the housing, a driving hub carried by the forward end of the drive shaft, a drive member located radially outwardly of said hub, a friction clutch having a member carried by said hub and another member carried by said drive member, a countershaft in the housing below the driven shaft, a pinion rotatable about said drive shaft rearwardly of said hub member and meshing with a pinion mounted on said countershaft, a pinion on the rear end of said countershaft meshing with an internal gear on the forward end of the driven shaft, a rotary pinion adjacent the rear end of said drive shaft meshing with said internal gear, selectively operable reversing means for locking said last-named pinion to the drive shaft and for locking to the drive shaft the first pinion, an external brake associated with said internal gear and adapted to brake the driven shaft, an operating member mounted in the housing intermediate of its ends, and operating connections between said member, the brake means, the friction clutch and the reversing means.

7. A transmission mechanism such as set forth in claim 6, in which the operating connection between the operating member and the friction clutch is located in part interiorly of the drive shaft.

8. In a transmission mechanism, the combination of a housing, a drive shaft arranged longitudinally within the housing, a drive member adjacent the forward end of the housing, a friction clutch between said drvie shaft and said drive member, a driven shaft in the rear portion of the housing axially offset from the drive shaft, reduction gearing associated with the driven shaft, operating connections between the drive shaft and the reduction gearing including a shiftable double dog clutch member for driving the driven shaft forwardly or reversely, a brake for braking the driven shaft, and a movable control member in the housing operatively connected to the brake, the shiftable member and the friction clutch.

9. A transmission mechanism such as set forth in claim 8, in which the movable control member is mounted above the drive shaft and intermediate the ends of said shaft.

10. In a transmission mechanism, the combination of a drive shaft, a driven shaft in parallel offset relation thereto, an internal gear carried by the driven shaft, means operable from the drive shaft and including pinions engaging the internal gear at different respective points for driving the driven shaft forwardly or reversely, said means also including a countershaft having a gear meshing with a gear mounted around the drive shaft, a drive member located adjacent that end of the drive shaft which is remote from the internal gear, a friction clutch between said drive member and said drive shaft, and a movable control member for said driving means operatively connected to said friction clutch for controlling the operation thereof, the connection between the control member and clutch including a member disposed interiorly of the drive shaft.

11. In a transmission mechanism, the combination of a drive shaft, a driven shaft in parallel offset relation thereto, an internal gear carried by the driven shaft, means operable from the drive shaft and including pinions engaging the internal gear at different respective points for driving the driven shaft forwardly or reversely, said means also including a countershaft having a gear meshing with a gear concentric to the drive shaft, a movable control member for said driving means, an external friction brake embracing said internal gear and adapted to brake the driven shaft, and an operating connection between said brake and said movable control member.

12. In a transmission mechanism, the combination of a housing, a driven shaft located in the rear portion of the housing, a drive shaft above the driven shaft and in offset parallel relation thereto and having a forward end adjacent the forward end of the housing, a driving hub carried by the forward end of the drive shaft, a drive member located radially outwardly of said hub, a friction clutch having a member carried by said hub and another member carried by said drive member, a countershaft in the housing below the driven shaft, a pinion rotatable about said drive shaft rearwardly of said hub member and meshing with a pinion mounted on said countershaft, a pinion on the rear end of said countershaft meshing with an internal gear on the forward end of the driven shaft, a rotary pinion adjacent the rear end of said drive shaft meshing with said internal gear, selectively operable means for locking said last-named pinion or the first pinion to the drive shaft including a sliding dog clutch member about the drive shaft and a pivoted operating member for said clutch member located in the upper part of the housing, a brake member for the driven shaft located in the rear portion of the housing and operably connected to said operating member, and operating means for said friction clutch operably connected to said operating member.

13. In a transmission mechanism, the combination of a housing, a driven shaft located in the rear portion of the housing, a drive shaft above the driven shaft and in offset parallel relation thereto and having a forward end adjacent the forward end of the housing, a driving hub carried by the forward end of the drive shaft, a drive member located radially outwardly of said hub, a friction clutch having a member carried by said hub and another member carried by said drive member, a countershaft in the housing below the driven shaft, a pinion rotatable about said drive shaft rearwardly of said hub member and meshing with a pinion mounted on said countershaft, an internal gear on the forward end of the driven shaft, a pinion on the rear end of said countershaft meshing with said internal gear, a rotary pinion adjacent the rear end of said drive shaft meshing with said internal gear, a partition extending transversely of said housing and located forwardly of said internal gear and in proximity thereto, selectively operable means for locking said last-named pinion or said first-named pinion to the drive shaft, and a member located rearwardly of said partition and supported therefrom for supporting the inner end of the driven shaft.

14. In a transmission mechanism, the combination of a housing, a driven shaft located in the rear portion of the housing, a drive shaft above the driven shaft and in offset parallel relation thereto and having a forward end adjacent the forward end of the housing, a driving hub carried by the forward end of the drive shaft, a drive member located radially outwardly of said hub, a friction clutch having a member carried by said hub and another member carried by said drive member, a countershaft in the housing below the driven shaft, a pinion rotatable about said drive shaft rearwardly of said hub member and meshing with a pinion mounted on said countershaft, an internal gear on the forward end of the driven shaft, a pinion on the rear end of said countershaft meshing with said internal gear, a rotary pinion adjacent the rear end of said drive shaft meshing with said internal gear, a partition extending transversely of said housing and located forwardly of said internal gear and in proximity thereto, selectively operable means for locking said last-named pinion or said first-named pinion to the drive shaft, and a member located rearwardly of said partition and supported therefrom for supporting the inner end of the driven shaft, said supporting member having supporting bosses for the pinions engaging the internal gear.

15. In a transmission mechanism, the combination of a front drive shaft and a rear driven shaft offset from the drive shaft, a forwardly located friction clutch for controlling the operation of the drive shaft, an internal gear on the forward end of the drive shaft, means cooperating with said internal gear providing a reversible reduction gearing between said shafts and having as an element thereof a sliding dog clutch member movable lengthwise of the drive shaft, an operating member for said dog clutch member, a brake band embracing said internal gear and adapted to brake the driven shaft and operably connected to said operating member, means for operating said friction clutch, and means operably connecting the friction clutch operating means to said operating member.

16. In a transmission mechanism, the combination of a housing, a drive shaft in the forward portion of the housing, a driven shaft in the rear portion of the housing and in offset parallel relation to the drive shaft, reversible reduction gearing means between the inner ends of the shafts, a driving hub carried by the forward end of the drive shaft, a drive member located radially outwardly of said hub, a friction clutch having a member carried by said hub and another member carried by said drive member, means for operating said friction clutch associated with the friction clutch member carried by the hub, an operating member for said reduction gearing means movably mounted within said housing in the upper portion thereof intermediate of the ends of the drive shaft, and control means for controlling the operation of said friction clutch operably connected to said operating means and located in part interiorly of the drive shaft.

17. In a transmission mechanism, the combination of a housing, a driven shaft located in the rear portion of the housing, a drive shaft above the driven shaft and in offset parallel relation thereto and having a forward end adjacent the forward end of the housing, reversible reduction gearing means between said shafts, an operating member for said last-named means located in the upper intermediate portion of the housing, a driving hub carried by the forward end of the drive shaft, a drive member located radially outwardly of said hub, a friction clutch having a member carried by said hub and another member carried by said drive member, said friction clutch having lever members carried by said hub for controlling the engagement and disengagement of the clutch, a cam member for actuating the lever members having an actuating rod portion disposed within said drive shaft, and means for operably connecting said rod portion with said operating member.

18. In a transmission mechanism, the combination of a housing, a driven shaft located in the rear portion of the housing, a drive shaft above the driven shaft and in offset parallel relation thereto and having a forward end adjacent the forward end of the housing, reversible reduction gearing means between said shafts, an operating member for said last-named means located in the upper intermediate portion of the housing, a driving hub carried by the forward end of the drive shaft, a drive member located radially outwardly of said hub, a friction clutch having a member carried by said hub and another member carried by said drive member, said friction clutch having lever members carried by said hub for controlling the engagement and disengagement of the clutch, a cam member for actuating the lever members having an actuating rod portion disposed within said drive shaft, and means for operably connecting said rod portion with said operating member, said lever members acting on the friction clutch member carried by the hub to hold said member out of engagement with the other clutch member when said operating member is in the neutral position.

19. In a transmission mechanism, the combination of a housing, a driven shaft located in the rear portion of the housing, a drive shaft above the driven shaft and in offset parallel relation thereto and having a forward end adjacent the forward end of the housing, reversible reduction gearing means between said shafts, an operating member for said means movably mounted within the upper intermediate portion of the housing, a driving hub carried by the forward end of the drive shaft, a drive member located radially outwardly of said hub, a friction clutch having a member carried by said hub and another member carried by said drive member, an expansible fluid-actuated member associated with the friction clutch member carried by said hub and adapted to move said friction member into engagement with its co-acting member, a fluid supply conduit for said fluid-actuated member located within the drive shaft, fluid control means in communication with said conduit, and means for operably connecting said operating member to said fluid control means.

20. In a transmission mechanism, the combination of a drive shaft in the form of a tubular member, a driven shaft in parallel offset relation to the drive shaft, reversible reduction gearing means between said shafts, a movable control member for said reduction gearing means, a driving hub carried by that end of the drive shaft which is remote from the driven shaft, a drive member located radially outwardly of said hub, and a friction clutch having a member carried by said driving member and a sectional engaging and disengaging member carried by said hub, said movable control member being operably connected to said engaging and disengaging clutch member, and the connection between said parts including a member disposed interiorly of the drive shaft.

21. In a transmission mechanism, the combination of a drive shaft in the form of a tubular member, a driven shaft in parallel offset relation to the drive shaft, reversible reduction gearing means between said shafts, a movable control member for said reduction gearing means, a driving hub carried by that end of the drive shaft which is remote from the driven shaft, a drive member located radially outwardly of said hub, a friction clutch having a member carried by said driving member and a sectional engaging and disengaging member carried by said hub, said movable control member being operably connected to said engaging and disengaging clutch member, the connection between said parts including a member disposed interiorly of the drive shaft, the engaging and disengaging member of the clutch comprising a pair of separable sections having pinching levers associated therewith, and the member disposed interiorly of the shaft being a longitudinally movable cam member for operating said levers.

JOHN O. BERNDTSON.

REFERENCES CITED

The following references are of record in the file of this patent:

UNITED STATES PATENTS

| Number | Name | Date |
| --- | --- | --- |
| 1,099,520 | Spacke et al. | June 9, 1914 |
| 1,463,327 | Lewis | July 31, 1923 |
| 1,685,502 | Pearmain | Sept. 25, 1928 |
| 1,693,645 | Fahrney | Dec. 4, 1928 |
| 1,778,970 | Cotta et al. | Oct. 21, 1930 |
| 1,784,354 | Haussman | Dec. 9, 1930 |
| 2,023,584 | Harvey | Dec. 10, 1935 |
| 2,023,585 | Harvey | Dec. 10, 1935 |
| 2,052,650 | Pearmain | Sept. 1, 1936 |
| 2,052,651 | Pearmain | Sept. 1, 1936 |
| 2,091,557 | Montgomery | Aug. 31, 1937 |
| 2,101,774 | Brasfield | Dec. 7, 1937 |
| 2,106,958 | Pettit | Feb. 1, 1938 |
| 2,180,470 | Jaeger et al. | Nov. 21, 1939 |
| 2,214,164 | Fawick | Sept. 10, 1940 |
| 2,267,650 | Hale | Dec. 23, 1941 |
| 2,321,098 | Morse | June 8, 1943 |
| 2,321,255 | Schultze et al. | June 8, 1943 |

FOREIGN PATENTS

| Number | Country | Date |
| --- | --- | --- |
| 306,788 | Great Britain | Feb. 28, 1929 |